Jan. 13, 1931.                 T. M. HAMILTON                    1,788,518
                        DIRECTION INDICATOR FOR AUTOMOBILES
                              Filed Feb. 26, 1930
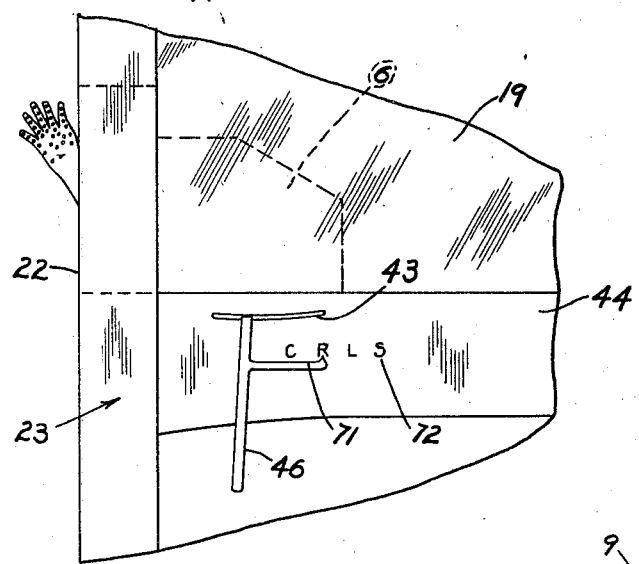
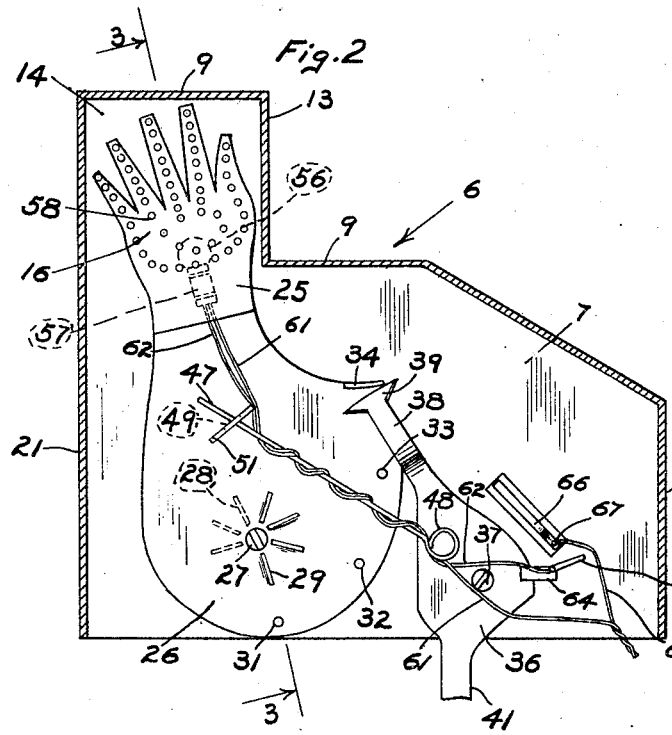
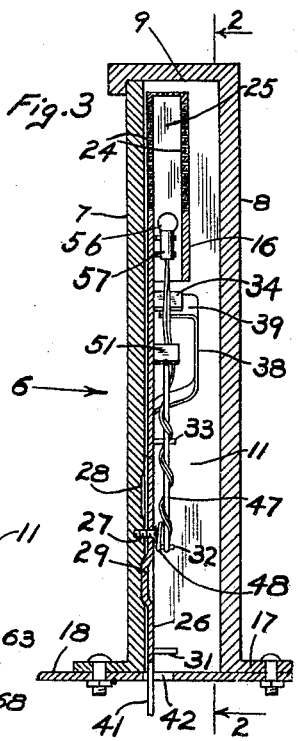
Inventor
T. M. Hamilton
by Hazard and Miller
Attorneys Patented Jan. 13, 1931

1,788,518

UNITED STATES PATENT OFFICE

THOMAS M. HAMILTON, OF ANAHEIM, CALIFORNIA, ASSIGNOR OF ONE-HALF TO FRED A. WESTERHOLD, OF ANAHEIM, CALIFORNIA

DIRECTION INDICATOR FOR AUTOMOBILES

Application filed February 26, 1930. Serial No. 431,473.

This invention relates to vehicle signals.

An object of the invention is to provide a novel type of vehicle signal which includes a movable indicating hand, and actuating means associated therewith and operable from the interior of the automobile to move the hand optionally to withdrawn position wherein the hand can not be seen, or to any one of a plurality of extended positions, each position having a certain significance whereby the driver of the vehicle may signal his intention to alter his present course.

Another object is to provide a vehicle signal as described, which includes means interposed between the indicating hand and the actuating means therefor, which causes the indicating hand to be swung accurately to selected signalling position, even though the actuating means is moved only approximately to the position corresponding to a given signalling position of the indicating hand.

A further object is to provide illuminating means for the indicating hand and a circuit associated therewith and provided with means for automatically closing the circuit when the hand is swung from withdrawn position.

A still further object is to provide a vehicle signal capable of operating with a high degree of efficiency, even though it be constructed of relatively few and simple parts, with the result that the liability of its becoming worn out or otherwise disqualified for service, is reduced to a minimum, and with the result that it may be manufactured and installed economically and with relative facility.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a view in elevation, looking forward of an automobile toward the windshield thereof, and showing the approximate positioning of my signalling device operatively installed thereupon. Portions of the figure are broken away to reduce its size.

Fig. 2 is a vertical sectional view through the housing of the signal, taken upon the line 2—2 of Fig. 3, with the direction of view as indicated, to show the actuating mechanism in elevation.

Fig. 3 is an oblique sectional view, the plane of section being indicated by the line 3—3 of Fig. 2, with the direction of view as indicated.

In its preferred embodiment, my improved vehicle signal is mounted within a housing indicated in its entirety at 6, and comprising front and rear walls 7 and 8 respectively, retained in spaced parallel relationship by top and side walls 9 and 11 respectively. An extended portion 13 of the top wall 9, provides a recess 14 for the reception of an indicating hand 16 when in retracted position.

Flanges 17 are formed at the bottom of the front and rear walls 7 and 8, to facilitate installation of the housing 6 upon the cowl 18 of an automobile, preferably just forward of the windshield 19 and with the outer side wall 21 of the housing 6, substantially flush with the left hand side 22 of the body 23 of the automobile, it being assumed that the installation being described, is upon an automobile of the left-hand drive type, and that it is desired that signals given by the driver of the vehicle to indicate contemplated alterations of his course, will be made upon the left-hand side of the vehicle.

A slot (not shown) is provided in the outer side wall 21 in register with the hand 16, to permit the hand to be swung optionally into any of a plurality of signalling positions wherein it extends through the side wall 21 so as to be visible to persons behind the automobile upon which the signal is installed, as well as to persons in other positions with respect thereto.

The indicating hand 16 is preferably made up of two plates 24 held in spaced, parallel relationship by sides 25, and is carried by a plate 26 which is mounted for rotary movement within the housing 6, by means of a machine screw 27 or other suitable pivot pin secured to the front wall 7. A plurality of depressions 28 are formed in the wall 7, these depressions being at the same radial distance from the pivot pin 27 and preferably equally spaced angularly thereabout; and preferably a plurality of raised portions 29 are formed upon the plate 26 in position to seat within certain of the depressions 28 when the indicating hand 16 is in withdrawn position, and when it is in each of the several extended or signalling positions.

Stop pins 31, 32, and 33, and a stop flange 34, are mounted rigidly upon the plate 26. Pereferably these stops 31 to 34 inclusive, are spaced equally with respect to their angular displacement about the pivot pin 27, but they are at successively varying radial distances therefrom, i. e., the pin 32 is at a greater radial distance from the pivot pin 27 than is the pin 31, and at a less radial distance from the pivot pin 27 than is the pin 33. Hence, when the plate 26 and indicating hand 16, turn in rotary movement about the pivot pin 27, the stop pins 31, 32, and 33 describe arcuate paths of successively varying radius.

An actuating lever 36 is pivotally mounted by means of a screw 37 or its equivalent, upon the front wall 7 adjacent the plate 26. An extension 38 of the lever 36, carries, a detent 39 in the form of a flange which is preferably of material width and curved in an arc, the center of which lies in the axis of the pivot pin 37. The extension 38 is so proportioned and arranged that as the lever 36 is swung in counterclockwise movement about the pivot pin 37 as viewed on Figure 2, the detent 39 is carried successively through the arcuate paths of the various stop pins 33, 32, and 31, in the order named. Moreover, when the lever 36 is in substantially the position indicated upon Fig. 2, it lies within the path of the top flange 34 to engage the under side thereof and thus limit movement of the plate 26 in a clockwise direction—it being movement thereof in this direction, which causes the withdrawal of the indicating hand 16 into the housing 6.

The actuating lever 36 is also provided with a handle portion 41 which extends downwards through a slot 42 in the cowl 18 and preferably through an arcuate slot 43 in the instrument panel 44, being there provided with a portion 46 which extends downwards in position to be easily gripped by the hand of the driver of the vehicle, or to be engaged by one of his knees, whereby the handle 46 may be swung laterally with respect to the automobile.

Resilient means are also provided for imparting rotary movement to the plate 26 and indicating hand 16 when the actuating lever 36 is swung. A laterally resilient arm 47 preferably composed of a suitable length of spring wire, is attached to the lever 36 in position to extend substantially radially from the pivot pin 37 thereof. In order to enhance the lateral resilience of the arm 47, I prefer to provide a few whorls 48 thereon, adjacent the end thereof which is secured to the lever 36. The other end of the arm 47 extends slidably through an aperture 49 in a bracket plate 51 which is rigid with the plate 26 at a point offset from the axis of the pivot pin 27. Moreover, the bracket plate 51 is upon the side of the plate 26 opposite from the lever 36, as clearly shown upon Fig. 2.

An electric-light bulb 56 is mounted through the expedient of a conventional electrical socket 57 within the indicating hand 16, and preferably a plurality of perforations 58 are provided in the indicating hand whereby the indicating hand 58 is rendered visible at night.

Circuit is provided for the energization of the lamp 56, this circuit including electrical conductors 61 and 62 which are preferably wound upon the flexible arm 47 to receive suitable support therefrom. One of the conductors, say the conductor 61, extends through the slot 42 into the body of the automobile and is connected to a suitable source of electrical energy. The other conductor 62, leads to a contact arm 63 which is carried by a block 64 of insulation, mounted upon the lever 36. An elongated switch contact 66 is mounted upon the wall 7 of the housing 6, in position to be engaged by the contact 63 as the lever 36 is swung from that position which causes full retraction of the indicating hand 16. The switch contact 66 is mounted upon a suitable block of insulation 67, and has a conductor 68 connected thereto, this conductor 68 also extending through the slot 42 to be connected to the source of electrical energy.

A finger 71 is provided upon the portion 46 of the handle 41 of the lever 36, and is arranged so as to cooperate with indicia 72 upon the instrument panel 44. Inasmuch as under ordinary circumstances, it is desired that the indicating hand 16 may be moved to any one of three positions in addition to its fully withdrawn position, there are four of the indicia 72, these preferably being the letters "C", "R", "L", and "S", these letters indicating "Closed", "Right", "Left", and "Slow."

Operation

Inasmuch as the point at which the flexible arm 47 is attached to the plate 26, is beyond the pivot pin 27 from the actuating lever 36, rotary movement of the plate 26 caused by movement of the lever 36 will be in the same direction of rotation. When the lever 36 is moved about its pivot pin 37, say in a counter clockwise direction as viewed upon Fig. 2, the outer end of the resilient arm 47 will be swung downwards, thus developing a force resiliently pressing the far side of the plate 26, also downwards to urge the plate 26 into rotary movement in the same direction of rotation as that of the lever 36. Owing to the engagement of one or more of the raised portions 29 of the plate 26 within the corresponding number of the depressions 28, rotation of the plate 26 will not start until a considerable degree of bending of the arm 47 has occurred, with the result that as soon as the lever 36 has been moved far enough to develop this necessary force, the indicating hand 16 will be snapped outwards from the housing 6. The parts are so proportioned and arranged that if the lever 36 is swung far enough in a counterclockwise direction, to position the finger 71 in registration with the second of the indicia 72, i. e., the indicium "R", the detent 39 will be moved into the path which is subsequently to be traversed by the stop pin 33. Hence, the rotation of the plate 26 which is caused by tensioning the resilient arm 47, will be stopped by engagement of the stop pin 33 with the detent 39; and the pin 33 is in such position upon the plate 26 that when this engagement takes place, the indicating hand 16 extends outwards and forwards in approximately the position indicated upon Fig. 1, this position being that generally recognized as indicating that the driver of the vehicle contemplates turning to the right. However, the flange defining the detent 39, is extended laterally to material width, so that this engagement of the pin 33 and detent 39 will take place and position the indicating hand 16 accurately even in the event that the actuating lever 36 has been swung only approximately to the corresponding position.

However, if the lever 36 is swung far enough to bring the finger 71 into register with the third indicium 72, i. e., the indicium "L", the detent 39 will be swung past the path of the pin 33 and into that of the pin 32. As a result of the angular separation of the pins 33 and 32, a greater amount of rotation of the plate 26 will take place before the pin 32 strikes the detent 39, with the result that when this engagement takes place, the hand 16 will be extended substantially horizontally, whereby the signal is given, indicating that the driver contemplates turning to the left. Similarly, if the lever 36 is swung to bring the finger 71 into register with the indicium "S", the pin 31 will engage the detent 39, under which circumstances, the indicating hand 16 will extend outwards and downwards, thereby giving the signal that the driver contemplates slowing or stopping his vehicle.

Obviously, the lever 36 may be swung into any one of these three positions, from fully retracted position; without the necessity of having to stop in any of the intermediate positions. Furthermore, the lever 36 may be swung from any of the extended positions into that position into which the finger 71 registers with the indicium "C" whereupon the plate 26 will be rotated in the reverse direction until the stop flange 34 engages the outer face of the detent 39, thereby limiting the inward movement of the hand 16.

Owing to the curvature of the detent 39 about the axis of the pivot pin 37, the indicating hand 16 will be disposed accurately in the selected signalling position, regardless of which portion of the detent 39 is engaged by the corresponding stop pin 31, 32, or 33, as the case may be.

The contacts 63 and 66 are so positioned with respect to each other, that engagement therebetween does not take place until the lever 36 has been swung to bring the finger 71 into registration with either one of the three indicia "R", "L", or "S", with the result that the lamp bulb 56 is energized only when the indicating hand 16 is swung to one of its three extended positions.

Owing to the fact that accurate positioning of the lever 36 is not essential to attain accurate positioning of the indicating hand 16, it is entirely feasible to so construct the device that the portion 46 of the handle 41 may be moved by the knee of the driver. This permits the driver to operate the device with the greatest facility, and almost instantaneously, without the necessity of having to divert his attention from manipulation of the vehicle.

It is to be understood that the details of the invention as herein disclosed, are subject to alteration within the spirit or scope of the appended claims.

I claim:

1. In a vehicle signal, a pivotally mounted indicator, an actuating lever therefor, means connecting said indicator to said lever to be swung thereby into selected position, and means for accurately positioning said indicator with only an approximate positioning of said lever.

2. In a vehicle signal, a housing, a plate mounted thereon for rotary movement, an indicating hand carried by said plate, an actuating lever pivoted on said housing, flexible means coupling said plate to said lever whereby the plate is turned by movement of the lever, and stop means cooperative with said plate for accurately positioning said hand with only an approximate positioning of said lever.

3. In a vehicle signal, a housing, a plate mounted thereon for rotary movement, an indicating hand carried by said plate, an actuating lever pivoted on said housing, flexible means coupling said plate to said lever whereby the plate is turned by movement of the lever, stop means cooperative with said plate for accurately positioning said hand with only an approximate positioning of said lever, and means for illuminating said indicating hand.

4. In a vehicle signal, a housing, a plate mounted thereon for rotary movement, an indicating hand carried by said plate, an actuating lever pivoted on said housing, flexible means coupling said plate to said lever whereby the plate is turned by movement of the lever, a plurality of stops rigid with said plate, and means actuated by said lever engageable with a selected one of said stops to retain said hand in predetermined position when the lever has been swung to selected position.

5. In a vehicle signal, a housing, a plate mounted thereon for rotary movement, an indicating hand carried by said plate, an actuating lever pivoted on said housing, flexible means coupling said plate to said lever whereby the plate is turned by movement of the lever, a plurality of stops rigid with said plate, and means actuated by said lever engageable with a selected one of said stops to accurately dispose said hand in predetermined position when the lever has been swung approximately to a selected position.

6. In a vehicle signal, a housing, a plate mounted thereon for rotary movement, an indicating hand carried by said plate, an actuating lever pivoted on said housing, flexible means coupling said plate to said lever whereby rotary movement of the lever effects rotary movement of said plate in the same direction of rotation, and stop means cooperative with said plate for accurately positioning said hand with only an approximate positioning of said lever.

7. In a vehicle signal, a housing, a plate mounted thereon for rotary movement, an indicating hand carried by said plate, an actuating lever pivoted on said housing, a laterally resilient arm extending from said lever, means slidably connecting said arm to said plate eccentrically in respect to the axis of rotary movement thereof whereby rotary movement is imparted to said plate by a proportional rotation of said lever, a plurality of stops arranged on said plate, and means carried by said lever and movable into the path of one of said stops, the stop into the path of which the movable means moves being determined by the extent of rotary movement of said lever.

8. In a vehicle signal, a housing, a plate mounted thereon for rotary movement, an indicating hand carried by said plate, an actuating lever pivoted on said housing, a laterally resilient arm extending from said lever, means slidably connecting said arm to said plate eccentrically in respect to the axis of rotary movement thereof whereby rotary movement is imparted to said plate by a proportional rotation of said lever, a plurality of stops arranged on said plate at successively varying radial distances from the axis of rotary movement of the plate, and a detent carried by said lever in position to move successively across the paths of the several stops as the lever is swung.

9. In a vehicle signal, a housing, a plate mounted thereon for rotary movement, an indicating hand carried by said plate, an actuating lever pivoted on said housing, a plurality of stops arranged on said plate in positions to traverse paths at successively varying radial distances from the pivotal axis of said lever, a detent carried by said lever in position to be swung thereby successively into said paths, and means actuated by said lever in swinging for imparting rotary movement to said plate.

10. In a vehicle signal, a housing, a plate mounted thereon for rotary movement, an indicating hand carried by said plate, an actuating lever pivoted on said housing, a plurality of stops arranged on said plate in positions to traverse paths at successively varying radial distances from the pivotal axis of said lever, a detent carried by said lever in position to be swung thereby successively into said paths, a lateral resilient arm extending from said lever, and means slidably connecting said arm to said plate at a point offset from the axis of rotary movement thereof.

11. In a vehicle signal, a housing, a plate mounted thereon for rotary movement, an indicating hand carried by said plate, an actuating lever pivoted on said housing, a plurality of stops arranged on said plate in positions to traverse paths at successively varying radial distances from the pivotal axis of said lever, a detent carried by said lever in position to be swung thereby successively into said paths, said detent being of extended width whereby it remains in each of said paths throughout a material extent of movement of the lever, and means actuated by said lever in swinging for imparting rotary movement to said plate.

12. In a vehicle signal, a housing, a plate mounted therein for rotary movement, an indicating hand carried by said plate and adapted to be swung thereby optionally to extend from the housing or to be withdrawn thereinto, a lever pivotally mounted within said housing, a plurality of stops arranged on said plate in positions to traverse paths at successively varying radial distances from the pivotal axis of said lever, a detent carried by said lever in position to be swung thereby successively through said paths and to be engaged by said stops with the hand in various extended positions, a laterally resilient arm extending from said lever, and means slidably connecting said arm to said plate at a point offset from the axis of rotary movement thereof.

In testimony whereof I have signed my name to this specification.

THOMAS M. HAMILTON.